3,065,022
COMBINATION JOINT COVER AND CEILING
FASTENING MEMBER FOR VEHICLES
Charles E. Schutte, Grosse Pointe Woods, Mich., assignor to Willys Motors, Inc., Toledo, Ohio, a corporation of Pennsylvania
Filed Aug. 19, 1960, Ser. No. 50,614
7 Claims. (Cl. 296—137)

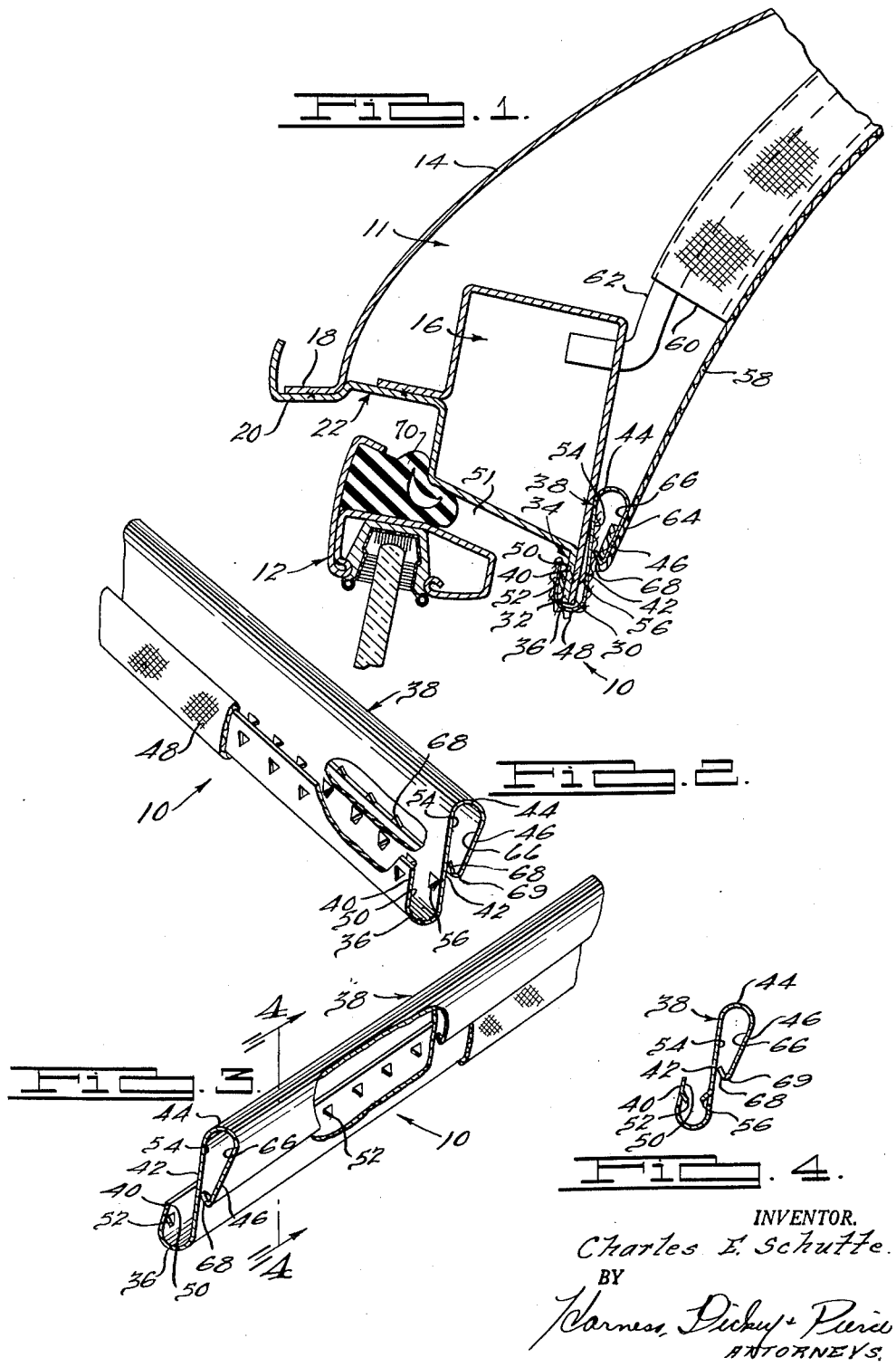

This invention relates generally to the structure in automotive vehicles for covering the joints between the doors and the frame and the structure for concealing the edges of the headliner and fastening them in fixed positions and more particularly to an improved member which functions both as a joint cover and a fabric fastening and concealing member.

It is common practice for the headliner in an automotive vehicle to be secured to the vehicle by means of a plurality of ribs running through a plurality of loops in the headliner. The ends of the ribs are secured to rectangular sections running along the opposite edges of the roof. The edges of the headliner are then secured to a bracket attached to the rectangular section. The rectangular section, in being formed has an exposed joint portion extending the length of the section, and a separate member with means for securing a fabric is required to cover this joint. Thus, in common practice two attachment means are required, one for the headliner and another for covering the joint.

It is an object of this invention to provide a combination joint covering and headliner fastening member.

Other objects, features, and advantages of the present invention will become apparent from the subsequent description and the appended claims taken in conjunction with the accompanying drawings, in which:

FIGURE 1 is a sectional view of a portion of an automotive vehicle showing portions of the roof, door and rectangular section, illustrating the combination joint cover and fabric fastener of this invention in assembly relation therewith;

FIGURE 2 is a perspective and partial sectional view of the combination joint covering and headliner fastening member of this invention;

FIGURE 3 is another perspective and partial sectional view of the combination joint covering and headliner fastening member of this invention; and FIGURE 4 is a sectional view of the combination member of this invention taken along the line 4—4 in FIGURE 3.

With reference to the drawing, the combination joint cover and headliner fastening member of this invention, indicated generally at 10, is illustrated in FIGURE 1 installed in a vehicle having a roof 11 and a door 12, only fragmentary portions of which are shown. The roof 11 consists of a curved roof panel 14 having a generally rectangular frame section 16 secured to the edges thereof so as to extend around at least portions of the periphery of the roof panel 14. The roof panel 14 has an outwardly extending edge flange 18 which is secured to an irregular flange 22 on the frame section 16 so that the section 16 is disposed below and within the peripheral confines of the roof panel 14. An extension 20 of the flange 22 cooperates with the flange 18 to form a gutter around the periphery of the roof 11. The section 16 has a joint 34, formed by downwardly extending portions 30 and 32, which projects into the interior portion of the vehicle.

The combination joint cover and fabric fastening member 10 consists of an elongated body 38, which is formed of a resilient material such as steel, is generally S-shaped in cross-section and includes a U-shaped lower portion 36. The U-portion 36 has a free leg 40 and a leg 42 which is common to a second U-shaped portion 44 above the portion 36 having a free leg 46. The U-portions 36 and 44 have their openings in a generally face-to-face relationship on opposite sides of the common leg 42. A fabric 48 is secured to the internal face 50 of the free leg 40 by means of a plurality of pressed-out tabs or teeth 52 extending internally towards the central area of the U-portion 36. The plurality of teeth 52 engage the end of the fabric 48 such that any axial pull upon the fabric 48 will only tend to better engage the end of the fabric 48 with the teeth 52. The fabric is wrapped around the external surface of the U-portion 36 and is then secured by gluing or other suitable means to the internal face 54 on the common leg 42 which is within the U-portion 44. A second plurality of teeth 56 located on the common leg 42 extends internally towards the central area of the U-portion 36.

In the assembly of the member 10 with the frame section 16, the U-shaped portion 36 of the body 38 is forced over the extending joint 34 and is secured thereto by the engagement of the teeth 52 and 56 against the portions 32 and 30, respectively, of the joint 34. Thus the joint 34 is covered and a decorative appearance is presented within the vehicle by the fabric 48.

A headliner 58 formed of a fabric, plastic, or the like material, usual in most vehicles for imparting a finished appearance to the interior, has a plurality of fabric or the like looped portions 60 each having a rib 62 extending therethrough. The ends of the ribs 62 are secured in any suitable manner to the rectangular sections 16 at opposite ends of the ribs, and a plurality of ribs are provided at positions along the length of the roof 11. The headliner 58 has end or edge portions 64 which must be concealed and firmly fastened to the roof 11 to impart the desired finished appearance to the interior of the vehicle. These portions 64 are inserted into the U-portion 44 against the internal face 66 on the free leg 46 into engagement with a plurality of teeth 68 which are formed on the free leg 46. The plurality of teeth 68 extend internally towards the central area of the U-portion 44, and are illustrated as being at the extremity of the leg 46 but it is to be understood that they may be spaced from the extremity so long as they extend inwardly. Each headliner end portion 64 is engaged with the plurality of teeth 68, in a manner to be described, such that any subsequent axial force on the headliner 58 will only tend to better engage the portion 64 with the teeth 68.

It should be noted that the U-portion 44 is almost closed at the extremity of legs 46 with a point 69 on the extremity of leg 46 being proximate to the common leg 42 and with a gap between the plurality of teeth 68 and the common leg 42 being just sufficient to permit the passage of the thickness of the fabric 48. The gap remaining between the teeth 68 and the fabric 48 is less than the thickness of the fabric of the headliner 58. The headliner end portion 64 is forced into the U-portion 44 by means of a flat tool resembling a putty knife in appearance (not shown) which is used to pry the free leg 46 away from the common leg 42. Upon withdrawal of the tool, the free leg 46, due to its resilience, will spring back to its original location and engage the headliner end portion 64. The restriction, then, between the plurality of teeth 68 and the face 54 with the fabric 48 thereon is such that any attempt to pull the headliner 58 out merely further engages the headliner end portion 64 with the plurality of teeth 68. The point 69 is located proximate to the common leg 42 to eliminate the possibility of an unsightly gap appearing between the leg 46 and the common leg 42.

Thus, by means of the single combination member 10, means have been provided both to cover the joint 34 and in turn the joint or meeting area 51 of the door 12 and the frame 16, and also to provide means for attachment of the loose edges of the headliner 58. A weather strip 70 is shown carried by the door 12 so as to engage the frame section 16, but it is to be understood that the strip 70 may be secured to the frame section 16 so as to engage the door 12. This is readily accomplished by clamping a portion of the strip 70 between the leg 40 and the downwardly extending frame section portions 30 and 32.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A combination joint covering and headliner attaching member for vehicles comprising an elongated body having a pair of U-shaped portions each having a free leg portion and a common leg portion, one of said pair opening upwardly for securing said member to a joint and for covering the joint, the other of said pair opening downwardly for engaging the headliner and retaining it within said downwardly opening portion, said pair opening in a generally face-to-face relationship on opposite sides of said common leg portion and each of said pair having a plurality of teeth on said free leg portion projecting toward said common leg portion.

2. The member of claim 1 in which each of said pluralities of teeth project generally internally away from the direction of opening of that one of said U-shaped portions with which it is associated.

3. The member of claim 2 in which one of said free leg portions associated with one of said U-shaped portions has its extremity proximate to said common leg portion substantially closing the opening of said one U-shaped portion.

4. The member of claim 3 in which said plurality of teeth associated with said one free leg portion are disposed at the extremity of said one free leg portion.

5. The member of claim 3 further including a plurality of teeth disposed on said common leg portion and extending internally towards the other of said U-shaped portions and generally away from the direction of opening of said other U-shaped portion.

6. An elongated member to be partially covered with a covering material for covering a joint and to be partially covered by and for securing a headliner comprising a generally U-shaped joint covering portion and a generally U-shaped headliner attaching portion, said joint covering portion opening upwardly for securing said member to a joint and for covering the joint, said headliner attaching portion opening downwardly for engaging the headliner, and retaining it within said downwardly opening portion, each of said U-shaped portions having a free leg portion and a leg portion common to each, said U-shaped portions opening in a generally face-to-face relationship on opposite sides of said common leg portion, said joint covering portion having a plurality of teeth on its free leg portion projecting toward said common leg portion in a direction generally away from the direction of opening of said joint covering portion, said headliner attaching portion having a plurality of teeth on the extremity of its free leg portion projecting toward said common leg portion in a direction generally away from the direction of opening of said fabric attaching portion, said teeth on said extremity of said free leg portion individual to said headliner attaching portion being disposed proximate to said common leg portion to define an aperture smaller than the combined thicknesses of the covering material and the headliner.

7. In a vehicle having a roof provided with a peripheral frame section and a headliner, the improvement comprising a member adapted to be mounted on said frame section for securing said headliner thereto and for covering joints at said frame section, said member comprising an elongated body having a downwardly opening U-shaped portion, coacting means integral with said portion and on said frame section for securing said body to said frame section so that a portion thereof below said U-shaped portion projects downwardly from said frame section for covering a joint, said U-shaped portion having a pair of downwardly extending legs which at one point are in a closely spaced relation, and means on said U-shaped portion above said point engageable with a headliner for retaining it within said U-shaped portion.

References Cited in the file of this patent

UNITED STATES PATENTS

| 1,768,873 | Whitlock | July 1, 1930 |
| 2,051,191 | Watson | Aug. 18, 1936 |
| 2,146,438 | Olson | Feb. 7, 1939 |
| 2,276,530 | Weaver et al. | Mar. 17, 1942 |
| 2,856,230 | Adell | Oct. 14, 1958 |

FOREIGN PATENTS

| 638,271 | Great Britain | June 7, 1950 |
| 711,673 | Great Britain | July 7, 1954 |